Aug. 29, 1933.    M. C. HUFFMAN    1,924,499
LUBRICATING DEVICE
Filed Dec. 21, 1929
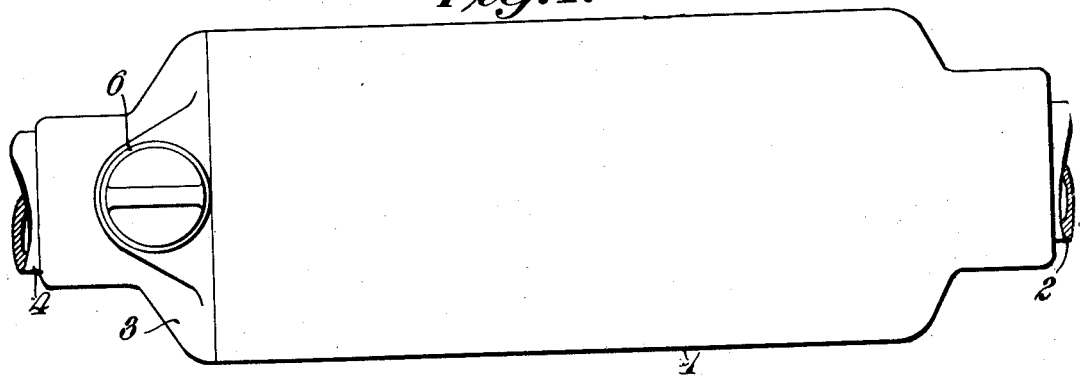
Fig. 1.
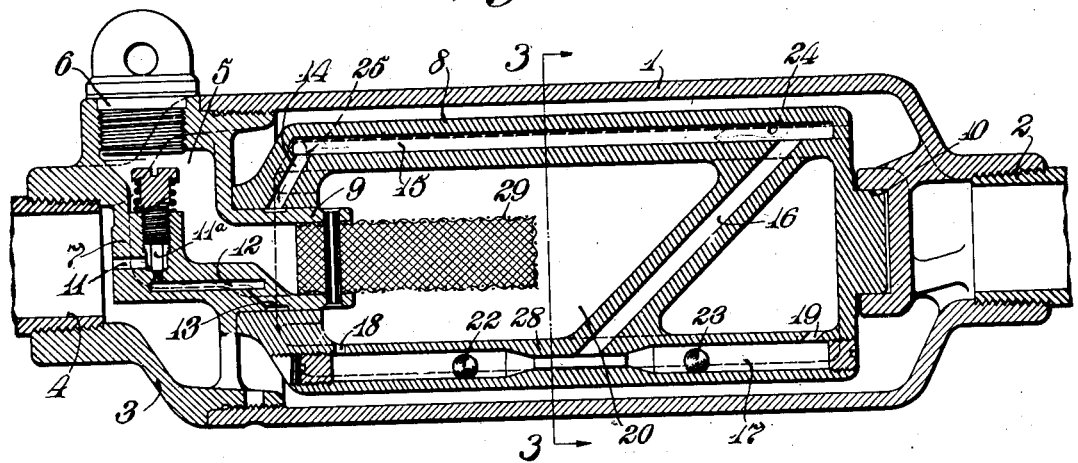
Fig. 2.
Fig. 3.    Fig. 4.
Inventor:
Mervin C. Huffman
by
Atty.

Patented Aug. 29, 1933

1,924,499

UNITED STATES PATENT OFFICE 1,924,499

LUBRICATING DEVICE

Mervin C. Huffman, Claremont, N. H., assignor to Sullivan Machinery Company, a corporation of Massachusetts Application December 21, 1929. Serial No. 415,696

21 Claims. (Cl. 184—55)

This invention relates generally to lubricating devices and in the specific embodiment illustrated herein the invention has particular significance in the field of line oilers, which is especially useful in connection with air lines supplying motive fluid to pneumatically operated mechanisms such as hammer drills, etc., although the invention may be used with steam lines used for similar or other purposes.

One object of my invention is to provide an improved lubricating device which is effective at all times for supplying a certain amount of lubricant to fluid flowing through the line irrespective of what position the oiler may be in, whether standing up or down or in any angular position. A further object is to provide an improved arrangement whereby a relatively large strainer is provided, thereby permitting the lubricant space to be easily and rapidly filled and yet have the lubricant entirely strained so as to exclude foreign matter from the passages in the device. Heretofore the strainer arrangements have been such that only a relatively small strainer screen could be used with the result that the lubricant would pass therethrough only relatively slowly, much to the annoyance of the workman who would proceed to puncture or remove the same in order to permit rapid filling of the lubricant chamber, this, of course, resulting in any and all foreign matter passing into the lubricant chamber and in time clogging the passages leading therefrom to the air line. Another object is to provide an improved arrangement whereby the amount of lubricant discharged from the lubricant chamber to the air line may be effectively and easily adjusted and yet is so arranged that the adjustment may not be readily tampered with or in any way accidentally moved so as to obtain an improper adjustment. A further and more specific object of my invention is to provide an improved arrangement whereby the parts may be readily and easily manufactured and assembled and which will have all the desired ruggedness which is essential in a device of this type which during normal use lies upon the ground and is dragged around thereon as the operator moves the tool or hose to different locations.

While other objects and advantages might be mentioned, these will be seen more readily from the following description of the accompanying drawing, which illustrates one specific embodiment of the invention, and in which:

Fig. 1 is a plan view of my improved device.
Fig. 2 is a vertical longitudinal section thereof.
Fig. 3 is a transverse section taken on line 3—3 of Fig. 2.
Fig. 4 is a detail sectional view showing certain of the fluid passages in the lubricant container.

The illustrative embodiment of my invention comprises an outer casing 1, having an inlet connection 2 at one end while the other end is provided with a removable cap 3 having an outlet connection 4 and a filling passage 5. A removable screw-threaded plug 6 is adapted to close this passage which extends through a suitable projection 7 extending substantially radially inwardly of the cap 3 but spaced from the walls thereof on three sides so as to permit line fluid to flow therearound.

A lubricant container or inner casing 8 is journaled for rotation at one end upon a sleeve 9, extending inwardly from the projection 7, while the other end is journaled in a suitable bearing 10 supported by ribs extending inwardly from the end of the casing 1, these ribs being spaced apart sufficiently to permit free passage of the air or other fluid flowing from connection 2 to 4.

The additional structure will be more readily understood by considering the operation thereof at the same time. Air, assumed to flow in through the connection 2, passes through the annular passage formed between the inner container 8 and the outer casing 1 then around the projection 7 to the outlet 4 and in so doing creates a slight reduction in pressure adjacent a passage 11. An adjustable valve 11$^a$ is provided for controlling fluid flow through the passage 11. This reduction in pressure tends to permit discharge of lubricant from the container as by way of passage 12, annular passage 13, passages 14 and 15, diagonal passage 16 and passage 17, which is adapted to communicate as by ports 18 or 19 with the lubricant chamber 20. The passage 17 is provided with a portion of reduced diameter, against which gravity operated check valves 22 or 23 are adapted to seat depending upon the position of the device. Line pressure is transmitted to chamber 20 through passage 24, the right end of which has direct communication with the air passage while the other end is turned at 25 to communicate with the top of the chamber 20. A passage 26 is similar to but reversely arranged with respect to the passages 24 and 25, in that it has direct communication with the line passage at its left end while the opposite end has a passage 27 communicating with the top of the chamber 20. The lubricant container or casing 8 has a portion 28 sufficiently weighted to hold the container in, or rotate it to, the position as shown whenever the oiler is positioned to have any appreciable horizontal component, whereby the upper part of the lubricant chamber 20 will have line pressure therein and this coupled with the reduced pressure at the passage 11 will cause the lubricant to flow through passage 17, past the gravity-operated check valves 22 and 23, through diagonal passage 16, and on out to passage 11 where the reduced pressure is encountered. Without this weighted portion lubricant container 8 might assume a position with passage 17 at the top in which case lubricant would flow out thru passage 26 and in any event no lubricant could flow through diagonal passage 16 as is required for normal operation. If the oiler is inclined so that its outlet 4 is above the inlet 2, ball 22 rolls down to close the left end of the reduced portion of passage 17, thereby preventing the pressure fluid which will now be in the left end of chamber 20 being drawn through port 18 and into the diagonal passage 16. Lubricant must therefore flow into the diagonal passage 16 through port 19. Due to the upper end of the passage 15 being above the level of the lubricant chamber 20 lubricant cannot flow by gravity from the chamber into the line. On the other hand if the device is positioned so that inlet 2 is above outlet 4 gravity-operated ball 23 closes the right end of the reduced portion of passage 17 thereby preventing discharge of fluid pressure from the right end of the chamber through the port 19. In this position lubricant will be discharged through port 18 and past check valve 22 which will have rolled to the left end of passage 17, and on out to the parallel passage 15 and passage 11. Lubricant is prevented from flowing by gravity from the chamber due to the end of the diagonal passage 16, which communicates with passage 15, being above the level of the lubricant in the chamber. When the oiler is positioned with inlet 2 above outlet 4 and accordingly with the air pressure in the space at the right end of the lubricant chamber it is desired to vent this pressure when the line pressure is shut off for otherwise lubricant might be forced back through passage 24 into the line. This venting is accomplished by the second passage 26 which communicates with the right end of the chamber and the line passage.

It is thus seen that the device will at all times operate automatically to maintain the proper position whereby lubricant may feed from the chamber 20 to the outlet 11.

The improved strainer arrangement consists in having the filling passage 5 extend through the bearing sleeve 9 to which the strainer 29 is secured. By extending within the chamber 20 the strainer may be made with a very large area without in any way diminishing the capacity of the device, while at the same time permitting the chamber to be filled rapidly as the area of the strainer usually determines the rate of filling. It will also be seen that due to the location of the strainer within the chamber and due to it being disposed at the extreme end of the tortuous filling passage 5 it is practically impossible for an operator to puncture or in any way tamper with the strainer, thereby insuring that clean lubricant will be supplied to the tools.

It will also be seen that the device may be easily assembled or disassembled merely by the removal of the head cover 3 whereupon the lubricant container 8 may be dropped out through the end of the casing 1. When the parts are thus disassembled the strainer screen 29 which may be of any suitable cross-sectional shape, but which is preferably cylindrical, will be entirely open for inspection and may be removed if foreign matter should have accumulated to an undesirable degree. To permit the ready removal of this screen any suitable means may be used but a removable pin is shown as being most adapted for quick and easy operation.

While I have in this application specifically described one embodiment which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A lubricating device comprising an outer casing having an inlet and outlet, an inner casing disposed therein and having a lubricant chamber, means for effecting a differential pressure on the lubricant contained in said chamber whereby the lubricant may feed to said outlet, and means for filling said inner casing including an angular passageway having a filler opening and terminating in the lubricant chamber of said inner casing and having a screen extending therein to enclose the end of said filling passage, said passage being so formed as to prevent direct access to said strainer through said filler opening.

2. A line oiler comprising, in combination, an outer casing having an inlet and outlet, an inner casing swiveled therein and spaced from the walls thereof to provide a main passage between said inlet and outlet, a lubricant chamber in said inner casing for containing a lubricant, and means for effecting a differential pressure on lubricant contained in said chamber whereby the lubricant may feed to said main passage at a substantially pre-determined rate irrespective of the position that the oiler might be in and including separate discharge passages for conducting lubricant from said chamber to the air line and each having an automatic check valve and respectively communicating with the opposite ends of said chamber.

3. A line oiler comprising in combination an outer casing having an inlet and outlet to which a fluid pressure line may be attached, an inner casing having a lubricant chamber and being swiveled within said outer casing and spaced from the walls thereof to provide a main passage between said inlet and outlet, and means for effecting differential pressure on the lubricant in said chamber whereby the lubricant may feed to the fluid line at a substantially pre-determined rate for any position of the oiler, said means including a passage and check valve arrangement automatically operative to maintain feeding of the lubricant in response to said differential pressure irrespective of the position of the oiler.

4. A line oiler comprising, in combination, a casing structure having an inlet and outlet adapted to be connected to a main air line, said casing structure having formed therein a passage extending therethrough connecting said inlet and outlet in communication, and means forming a lubricant chamber, and means for effecting a differential pressure on the lubricant in said chamber, and for feeding lubricant from said chamber to the air line including a passage arrangement formed in said casing structure and chamber forming means and including a passage communicating with said first mentioned passage for discharging lubricant thereto, a passage communicating with the lubricant chamber, and passage means formed within said chamber forming means for connecting said second and third mentioned passages, said last mentioned passage means disposed diagonally of said lubricant chamber.

5. A line oiler comprising, in combination, a casing structure having an inlet and outlet and a fluid passage extending therethrough connecting said inlet and outlet in communication, and means within said casing structure forming a lubricant chamber, said chamber forming means having formed therein supply and discharge passage arrangements for supplying pressure fluid from said fluid passage to said lubricant chamber and for discharging lubricant from the chamber to said fluid passage, said fluid supply passage arrangement including a passage for conducting pressure fluid from said fluid passage to said lubricant chamber, and said discharge passage arrangement discharging lubricant within said first mentioned fluid passage in the direction of fluid flow through said fluid passage, said discharge passage arrangement including substantially parallel passages formed in said chamber forming means and a passage extending diagonally across said chamber forming means for connecting said parallel passages.

6. The combination set forth in claim 5 further characterized by the provision of a gravity-operated check valve in one of said parallel passages.

7. The combination set forth in claim 5 further characterized by the provision of a plurality of gravity-operated check valves disposed in one of said parallel passages.

8. The combination set forth in claim 5 further characterized in that one end of said diagonal passage terminates near a transverse plane disposed substantially centrally of said chamber.

9. The combination set forth in claim 5 further characterized in that said diagonal passage extends from a point adjacent from one end of said chamber to a point intermediate the ends thereof, the latter end of said diagonal passage communicating with the parallel passage containing the gravity-operated check valve.

10. A line oiler comprising, in combination, an outer casing having an inlet and outlet adapted to have connection with a main fluid line, a removable head cover at one end of said casing having means providing a filling passage terminating in an axial projection, a casing disposed within said outer casing and having a lubricant chamber, one end of said lubricant casing being closed while the other end has an opening therethrough, means whereby said closed end is swiveled on said casing while said open end is swiveled on the axial projection of said filling passage, a passage in said lubricant casing allowing communication of pressure from the main line to said chamber, and means whereby lubricant may be discharged from said chamber to the main line including a pair of substantially parallel passages connected by a diagonal passage, one of said parallel passages having a portion of reduced diameter and gravity-operated check valves adapted to engage either side of said reduced portion, passages permitting communication between said chamber and said check valve passage, a diagonal passage connecting with the reduced portion of said check valve passage and said other parallel passage, and means for adjusting the flow of lubricant from said chamber to the main line.

11. A line oiler adapted to be inserted in a main fluid pressure line comprising, in combination, a casing structure having an inlet and outlet and a lubricant chamber, and means for effecting a differential pressure on the lubricant in said chamber whereby lubricant may be fed from said chamber to the main line, including a passage having each of its ends adapted for communication with said chamber and having a portion of reduced diameter, and a passage connecting into said reduced portion and leading to the fluid line.

12. The combination set forth in claim 11 further characterized by the provision of check valves in said passage having the portion of reduced diameter, whereby one or the other of said check valves may seat against said reduced portion when the oiler is in an inclined position.

13. A lubricating device comprising a casing having an inlet and an outlet connection, a member providing a lubricant chamber and rotatably mounted within said casing, and means for filling said lubricant chamber including an angular passageway having a filler opening and having a portion extending along the axis of said member and terminating in said lubricant chamber, said passageway having a screen extending in the lubricant chamber to enclose the end of said filling passage remote from said filler opening, said passage being so formed as to prevent direct access to said strainer through said filler opening.

14. A lubricating device comprising an outer casing having an inlet and an outlet, an inner casing disposed therein and having substantially free rotatable movement relative to said outer casing, and providing a lubricant chamber, a head member at one end of said outer casing having a projection forming a bearing for one end of said inner casing, and means for filling said inner casing including an angular passageway extending through said bearing and having a filler opening, said passageway terminating in the lubricant chamber of said inner casing and having a screen at the inner end of said filling passage extending within said lubricant chamber to enclose the end of said filling passage, said passageway being so formed as to prevent direct access to said screen through said filler opening and said head being removable from said casing to permit free access to said screen.

15. A lubricating device comprising an outer casing having an inlet and an outlet, an inner casing disposed therein and having substantially free rotatable movement relative to said outer casing and providing a lubricant chamber, means formed on said inner casing for maintaining said casing in substantially uniform position irrespective of rotation of the outer casing on a longitudinal axis, said inner casing having formed therein a lubricant discharge passage for conducting lubricant from the lubricant chamber to the air line and check valves carried by said inner casing operative upon inclined position of said device to control fluid flow from said lubricant chamber through said discharge passage.

16. A lubricating device comprising an outer casing having an inlet and an outlet, an inner casing disposed therein and having substantially free rotatable movement relative to said outer casing and providing a lubricant chamber, means formed on said inner casing for maintaining said casing in substantially uniform position irrespective of rotation of the outer casing on a longitudinal axis, said inner casing having formed therein a lubricant discharge passage for conducting lubricant from the lubricant chamber to the air line and check valves carried by said inner casing operative upon inclined position of said device to control fluid flow from said lubricant chamber through said discharge passage, said check valves being in open position when said lubricating device is in a horizontal position.

17. A line oiler comprising inner and outer casings, said inner casing supported for substantially free rotation relative to the outer casing and having a lubricant chamber, and filling means for said lubricant chamber including a filling passage extending along the axis of said rotatable casing and opening into said lubricant chamber, the inner end of said passage being formed within a tubular member projecting within said chamber, said inner casing being rotatably supported on and rotatable relative to said tubular member.

18. A lubricating device comprising a casing structure having an inlet and outlet, and a fluid passage extending through said casing structure for connecting said inlet and outlet, and means for supplying a lubricant to said fluid passage irrespective of the angular and tilted position of said casing structure including a member swingably mounted within said casing structure and having formed therein a lubricant reservoir and having alternatively operative lubricant discharge passages, each having an automatic check valve, one passage being opened when the casing structure is in one extreme endwise tilted position and the other passage being opened when the casing structure is in its other extreme endwise tilted position.

19. A lubricating device comprising a casing structure having an inlet and outlet, and a fluid passage extending through said casing structure for connecting said inlet and outlet, and means for supplying a lubricant to said fluid passage irrespective of the angular and tilted position of said casing structure including a member swingably mounted within said casing structure and having a weighted portion whereby said member tends to move to maintain said weighted portion at the bottom and said member having formed therein a lubricant reservoir and having alternatively operative lubricant discharge passages, each having an automatic check valve, one passage being opened when the casing structure is in one extreme endwise tilted position and the other passage being opened when the casing structure is in its other extreme endwise position, said discharge passages being formed in the lower weighted portion of said swingable member so that they assume a lowermost position in the casing structure irrespective of the angular position of the latter about its longitudinal axis.

20. A line oiler comprising inner and outer casings, said inner casing supported for substantially free rotation relative to the outer casing and having a lubricant chamber, said outer casing having an inlet and outlet and said casings cooperating to form a passage connecting said inlet and outlet, bearing means for said inner casing including a tubular bearing member projecting axially within the lubricant chamber, and passage means for conducting pressure fluid from said passage to the lubricant chamber and for conducting lubricant from said chamber to said passage including passage means formed in said tubular bearing member.

21. A line oiler comprising inner and outer casings, said inner casing supported for substantially free rotation relative to the outer casing and having a lubricant chamber, said outer casing having an inlet and outlet and said casings cooperating to form a passage connecting said inlet and outlet, bearing means for said inner casing including a tubular bearing member projecting axially within the lubricant chamber, and passage means for conducting pressure fluid from said passage to the lubricant chamber and for conducting lubricant from said chamber to said passage including passage means formed in said tubular bearing member, and communicating passage means formed in said inner rotatable casing.

MERVIN C. HUFFMAN.